Patented Oct. 14, 1952

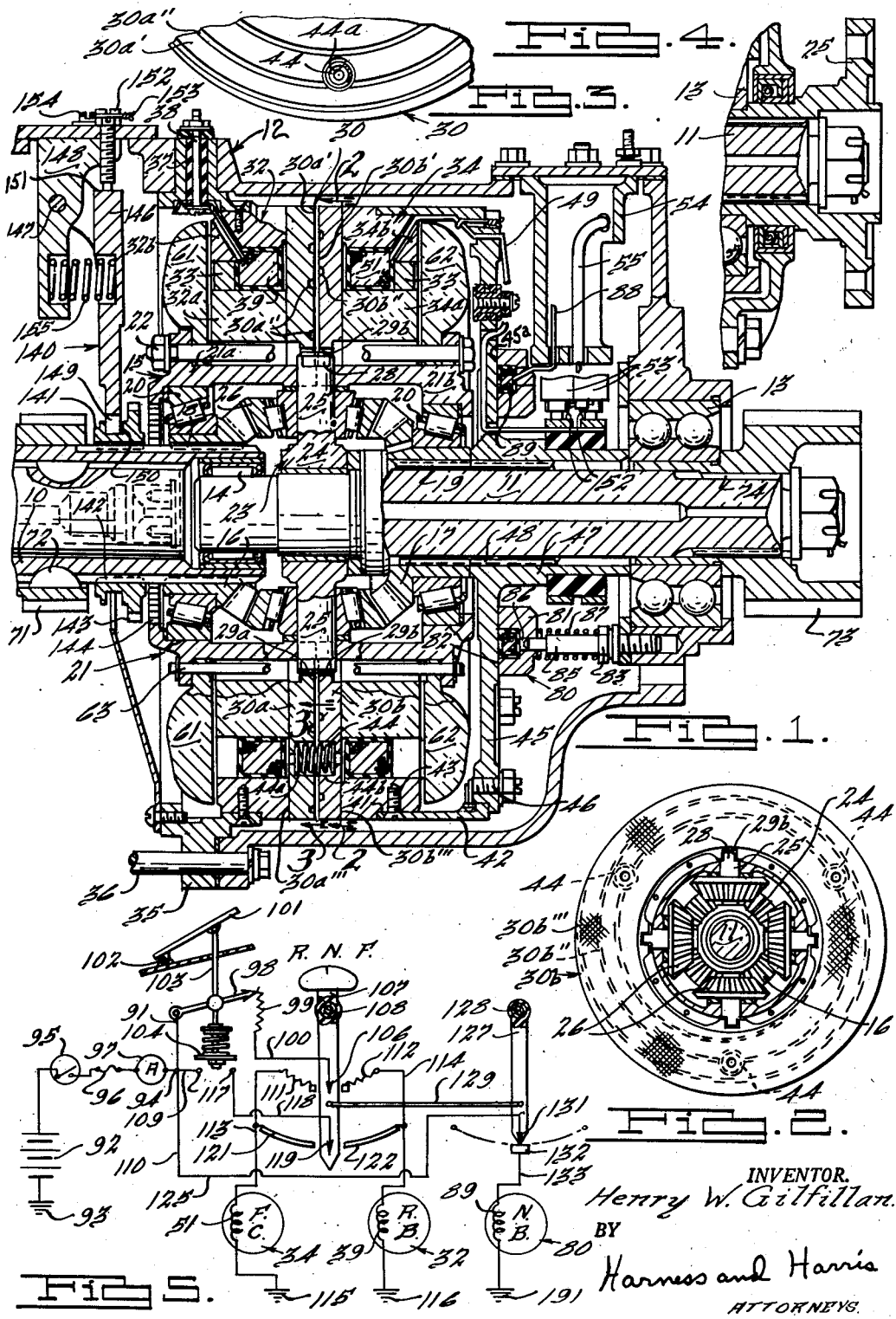

2,613,773

UNITED STATES PATENT OFFICE 2,613,773

TRANSMISSION AND CONTROLS THEREFOR

Henry W. Gilfillan, Detroit, Mich., assignor to Chrysler Corporation, Highland Park, Mich., a corporation of Delaware Application May 5, 1951, Serial No. 224,779

20 Claims. (Cl. 192—4)

This invention relates to a power transmission unit and controls therefor, the unit being particularly adapted for use as a reverse and reduction drive gear for a marine drive train installation. This is an improvement on the copending application of H. W. Gilfillan et al., Serial No. 213,522, filed March 2, 1951.

It is a primary object of this invention to provide a compact power transmission gear box adapted for use as a reduction and reverse gear unit in a marine drive train installation wherein the forward and reverse drives are controlled by novel, electrically operated, clutch and brake means that insure smooth, practically instantaneous, shifts between the forward, neutral and reverse drive ratios.

Secondly, it is another object of this invention to provide a power transmission unit with controls therefor that may be easily and economically located at any point adjacent to or remote from the transmission gear box. Reverse and reduction gearing of the type herein disclosed has usually been operated by clutch and brake devices controlled by mechanical linkages or by hydraulically operated mechanisms and each of these types of controls has several rather obvious disadvantages. Mechanical linkages rapidly develop wear and free-play that often render the control mechanisms difficult and slow to operate. In addition mechanical controls are expensive and they are also difficult to install at control stations remote from the power transmission unit. Hydraulic controls necessitate pressure fluid pumps and valving that are quite expensive and subject to disruption due to foreign matter entering the control fluid. In addition the fluid conduits that must be run to the various control stations throughout the ship are difficult to install and repair and they provide a constant source of possible failure which failure not only renders the control system inoperative but further has the danger of distributing the pressurized control fluid to various localities of the ship where it might ignite fires or damage cargo stored aboard the ship. With the electrically operated transmission control system herein disclosed, conventional weatherproofed wiring may be easily and economically run from the transmission gear box to any number of control stations throughout the ship and the operation of the gear box controls does not require the shifting of mechanical linkages nor the transfer of pressurized fluid between various locations about the ship. Furthermore, the electromagnetically operated armature unit utilized to control this transmission unit is of novel design and is arranged to be operated by inexpensive, reliable controls.

It is a further object of this invention to provide a power transmission unit having electrically operated brake means adapted to anchor the transmission driven shaft against rotation when the power transmission is in a no-drive or neutral condition, said neutral brake means being associated with the electrically operated controls for this transmission in such a manner that its operation is automatic with changes in the forward and reverse drives transmitted by this unit.

It is still another object of this invention to provide a simplified, improved, forward and reverse gear box having novel electromagnetically operated controls that include an improved type of drive transmitting armature unit and an improved control circuit therefor.

It is still another object of this invention to associate an electrically operated split or double armature clutch and brake control mechanism with an engine throttle control element such that modulated energization of the armature control circuit insures smooth, speedy changes in the forward and reverse drives transmitted.

Other objects and advantages of this invention will become readily apparent from a reading of the attached description of the invention and a consideration of the related drawings wherein:

Fig. 1 is a sectional elevational view of the power transmission unit embodying this invention;

Fig. 2 is a sectional elevational view taken along the line 2—2 of Fig. 1, the view being to a reduced scale;

Fig. 3 is a fragmentary elevational view taken along the line 3—3 of Fig. 1;

Fig. 4 is a fragmentary sectional elevational view of an alternate form of driven shaft end connection; and Fig. 5 is a schematic view of the electrical control circuit from the power transmission unit disclosed in Fig. 1.

The power transmission unit shown in Fig. 1 of the drawings comprises driving and driven shafts 10 and 11 respectively, said shafts being axially aligned and journalled in the housing unit 12. The bearing support for driving shaft 10 in housing 12 is not shown whereas the bearing support 13 for the driven shaft 11 is clearly disclosed. The forward end of driven shaft 11 is shown piloted within the rear end portion of driving shaft 10 by means of a bearing assembly 14. Encircling and extending between the adjacent ends of the shafts 10, 11 is a differential gear unit 15. Differential gear unit 15 comprises a pair of axially spaced apart side gear elements 16 and 17 respectively. Side gear element 16 is drivingly connected to the driving shaft 10 by means of the splined connection 18. Side gear element 17 is connected to the driven shaft 11 by means of the splined connection 19. Encircling the axially spaced side gears 16, 17 and journalled thereon by means of the bearings 20 is the drum-like differential carrier case 21. Carrier case 21 is of a two-piece or split case construction wherein the two cup-like parts 21a, 21b of the casing are held in assembled position by means of a plurality of bolt and nut connections 22.

Mounted within the carrier case 21 and journalled on the forward end portion of the driven shaft 11 is a pinion gear support member 23. Pinion gear support member 23 comprises a hub portion 24 with a plurality of radially extending spoke elements 25 projecting from the hub that journals the several differential pinion gears 26. In the construction herein disclosed the support member 23 has four spoke elements 25 which spoke elements are arranged at right angles to one another (see Fig. 2). The outer ends of the several spoke elements 25 pierce the wall of the carrier case 21 and project radially outwardly therebeyond a sufficient distance to support the concentrically arranged double armature unit 30. The outer ends of spokes 25 provide stud formations 28 that are adapted to be drivingly seated in slotted formations 29a, 29b formed in the inner peripheral edges of face-to-face arranged armature members 30a, 30b respectively. The connections 28, 29a, 29b, between the support spokes 25 and the split armatures 30a, 30b permit axial shift of the armature plates 30a, 30b relative to the differential case 21.

Each of the split or double armature elements 30a and 30b is a flat ring-like plate element as clearly shown in Fig. 2. Formed along the inner peripheral edge of the armatures 30a and 30b are the drive transmitting, stud receiving, formations 29a and 29b respectively. The inner side faces 30a' and 30b' of the armatures 30a and 30b respectively, are relatively smooth and flat but have formed therein a series of spiral grooves 30a'' and 30b'' respectively. The spiral grooves 30a'' and 30b'' prevent the development of adhesive forces between the armatures, due to trapping of oil between the surfaces 30a' and 30b', which forces might interfere with quick disengagement of the surfaces 30a' and 30b' on deenergization of the solenoid coil units 32 and 34 respectively. The outer faces 30a''' and 30b''' of the armature plates that are adapted to be drawn into drive transmitting engagement with opposed side faces of the coil elements 32 and 34 respectively, are preferably roughened slightly to prevent slip between these engageable surfaces. Fig. 2 has the outer face 30b''' of armature disc 30b hatched to indicate the slight surface roughening applied to this surface. It has been found that this initial roughening of the armature faces 30a''' and 30b''' eliminates the necessity of a run-in period for the electromagnetic clutch and brake elements 32 and 34 of this power transmission unit and thus the transmission unit operates at peak efficiency during initial use and at all other times. While this slight roughening of the surfaces 30a''' and 30b''' is not an absolute necessity, still, it has been found to be quite advantageous.

The inner faces 30a' and 30b' of the armatures 30a and 30b each have a number of depressed spring seats 44a and 44b respectively that are adapted to be axially aligned and to receive the compression spring elements 44. Spring elements 44 tend to continuously separate the armatures 30a and 30b and to lightly force the outer faces 30a''' and 30b''' of the armatures into engagement with the opposed faces of the coil elements 32 and 34 respectively. Thus due to the springs 44 the armature plate 30a is normally in contact with the coil element 32 and the armature plate 30b is normally in contact with the coil element 34. Due to this spring pressed contact of the armature plates 30a and 30b with each of the coil elements 32 and 34, a closed magnetic circuit is always available on initiating energization of either of the coil elements 32 and 34. This closed circuit insures a very fast acting clutch and brake control for the transmission unit disclosed. The spring separated, split or double armatures 30a and 30b not only insure a fast acting transmission control system but in addition these double armatures provide a means for modulating the engaging and disengaging action of the associated clutch and brake devices. On initiating energization of coil element 32 the armature plate 30a is in engagement with the opposed, inner side face of the coil element 32 and a closed magnetic circuit is available. Thus armature 30a and coil 32 will immediately be held together with a relatively light force in addition to the force exerted by the springs 44. As the energization of the coil 32 increases the armature plate 61 on the outer side of coil 32 (to be described subsequently) will then be drawn into contact with the outer side face of the coil 32 and thus the electromagnetic circuit and the force engaging the armature 30a and coil 32 will be gradually increased. On further energization of the coil 32 the other split or double armature 30b will be drawn into contact with the armature 30a and thus the electromagnetic circuit further increased. It is thought to be obvious that the split or double armature construction herein disclosed provides for modulated clutch and/or brake control in and of itself regardless of the method of applying current to the coil elements 32, 34. However, as will be subsequently explained, this electromagnetic armature construction is associated with an engine throttle control device that modulates the current to the coils 32 and 34 in such a manner that smooth feathered engaging and disengaging action of the clutch and brake transmission control devices is automatic. While the action of the double armature has been explained with respect to only energization of coil 32, it is thought to be obvious that a like action will take place during energization of coil 34.

On deenergization of the coil element 32, after full energization, first the armature plate 30b will be released and forced back into engagement with the coil element 34 by the spring 44. Thereafter the electromagnetic circuits through the armature elements 61 and 30a will be reduced and a gradual deenergization and release of the drive transmitting connection between the armature 30a and coil 32 will result. Due to the initial release of the armature plate 30b on deenergization of the coil 32, it is apparent that armature 30b will be in actual contact with the coil 34 before the coil 32 is completely deenergized so that if the coil 34 is thereafter energized there always exists a closed electromagnetic circuit to initiate energization of either of coil elements 32 or 34. The operation of the double armature members 30a, 30b in this transmission unit will be more fully described subsequently.

In the construction herein disclosed the differential pinion gear elements 26 are formed as combination bearing and gear elements wherein the outer race of the bearing element provides the pinion gear element that meshingly engages with and extends between the axially spaced apart side gear elements 16, 17. It is realized that other types of differential pinion gears than those herein disclosed may be utilized in a differential transmission gearing of the type herein disclosed without altering applicant's invention in any way but this type of pinion gearing has been found to be quite satisfactory.

Encircling the differential carrier case 21 and arranged on opposite sides of the armature members 30a, 30b are a pair of electromagnetic coil elements 32 and 34 respectively. The coil elements 32 and 34 are each formed from a pair of spaced, concentrically arranged, magnetizable rings 32a, 32b and 34a, 34b respectively. Each pair of concentric rings are drivingly connected by non-magnetizable, circumferentially spaced, struts 33. Fixedly mounted between each pair of concentric rings 32a, 32b and 34a, 34b is a coil winding 39 and 51 respectively. Each of the outer rings 32b and 34b include means around their outer peripheral surfaces whereby the coil elements may be supported in predetermined positions within the housing 12. Coil ring 32b is fixedly connected to the housing 12 by means of the peripheral flange formation 35 that is connected to housing 12 by the bolt and nut connectors 36. Flange formation 35 is pierced by an opening 37 that receives a conductor element 38 adapted to connect the coil winding 39 of coil element 32 to a suitable electrical source.

The coil ring 34b has a step formation 41 in its outer peripheral surface that receives a ring element 42. Ring element 42 is connected to the coil ring 34b by means of screw connectors such as the connector 43. Ring 42 is supported by and connected to a spider element 45 by means of bolt connections 46. Hub element 47 of the spider element 45 is drivingly connected to the driven shaft 11 by means of the splined connection 48. Spider element 45 has suitably mounted therein conductor elements 49 that are adapted to transmit electrical energy from a suitable supply source to the coil winding 51 of the coil element 34. As spider element 45 is rotatable, a suitable slip ring connection 52 is provided between the fixed electrical contacts 53 and the rotatable conductors 49. The leads 55 for the fixed contacts 53 may be supported in a transmission case sleeve 54 or anchored in position within housing 12 in any other suitable manner.

Encircling the carrier case 21 of the differential gear unit 15 and arranged on the outer sides of the coil elements 32 and 34 are a pair of armature members 61 and 62 respectively. The armature members 61 and 62 are drivingly connected to the carrier case 21 by means of drive pin connections such as the pins 63. Armature elements 61 and 62 are axially shiftable along the carrier case 21 due to the looseness of the pin connections 63.

Drive is transmitted through this power transmission unit in the following manner:

If the driven shaft 11 is to be driven forwardly, that is in the same direction as the driving shaft 10, then the electromagnetic clutch element 34 is energized and the electromagnetic brake element 32 is deenergized whereby the armature members 30b and 62 will be drawn into drive transmitting frictional engagement with the opposite side surfaces of the coil member 34 such that the carrier case 21 and the driven shaft 11 will be drivingly locked together. With the carrier case 21 fixed to the driven shaft 11, the differential gearing 16, 26, 17 is locked in a fixed condition and drive is transmitted directly from the driving shaft 10 to the driven shaft 11 at a 1 to 1 ratio. If reverse drive is to be transmitted through the gear box, that is drive of the driven shaft 11 in a direction opposite to that of the drive shaft 10, then the electromagnetic brake 32 is energized and the electromagnetic clutch element 34 is deenergized whereby the armature elements 61 and 30a are drawn into drive transmitting frictional engagement with the opposite side surfaces of the fixed brake element 32. Engagement of the armature member 30a with the fixed brake element 32 anchors the differential carrier case 21 against rotation. With the carrier case 21 anchored to the housing 12 by brake 32 then rotation of the driving side gear 16 will cause the pinion gear elements 26 to rotate in such a manner that the driven side gear 17 will be rotated in a direction opposite to that of the driving side gear 16. As side gears 16, 17 are fixedly connected to their respective shafts 10, 11, it is obvious that the driven shaft 11 will be driven in a direction opposite to that of the driving shaft 10.

Input to the driving shaft 10 may be directly from an engine crankshaft or through gearing (not shown) that is meshingly engaged with the pinion gear element 71 that is keyed to the driving shaft 10 as at 72. The output from driven shaft 11 may be transmitted to a final drive element (not shown) through reduction gearing (not shown) that is meshingly engaged with the driven pinion 73 that is splined to the rear end portion of driven shaft 11 by the connection 74. If direct drive from the driven shaft 11 to a final drive element such as a prop shaft or the like is desired, then a flanged connection such as that shown at 75 in Fig. 3 may be splined to the driven shaft 11 to provide means to directly connect driven shaft 11 to the final drive member to be driven thereby.

Marine reversing gearing of the general type herein disclosed has been plagued by a phenomena that is very objectionable and often causes serious trouble. This phenomena results from the fact that when the power transmission gearing is established in a neutral or no-drive condition, there is a broken drive train between the driving and driven shafts that will permit the driven shaft 11 to rotate freely in either direction. Accordingly, if the transmission is moved from a forward or reverse drive transmitting condition to the neutral position the passage of water through the associated propeller shaft, as the boat glides through the water, is sufficient to keep the propeller shaft rotating and frequently the rotating propeller will foul lines, fish nets and other gear located beneath the vessel. An even more serious consequence of the fact that there is a broken drive connection between the driving and driven shafts when the transmission gearing is arranged in a neutral or no-drive condition, results from the fact that friction within the gear unit 15 may be sufficient to cause the differential gearing to transmit some drive between the driving and driven shafts 10, 11 even though the electrically operated clutch and brake devices 32, 34 of the transmission gearing are in a deenergized condition. As a result, if the transmission is in neutral and the engine is idling or being raced to warm it up, there is danger that the propeller shaft will rotate and the ship may move either forwardly or in a reverse direction unless it is suitably anchored at the time. This undesired movement of the vessel due to the friction of the differential gearing transmitting drive can frequently cause damage to the vessel and/or to fishing gear or structures located adjacent to or beneath the vessel at the time of the unintended movement.

The invention herein disclosed provides a means for eliminating any undesired movement of the driven shaft 11 whenever the transmission gearing is in a no-drive or neutral condition. Unintended rotation of the driven shaft 11 is prevented by means of the electrically operated brake mechanism 80 that is adapted to be frictionally engaged with a side surface of the spider element 45 whenever the transmission is conditioned for neutral or no-drive. Brake mechanism 80 comprises an electromagnetic coil element 81, similar in construction to coil elements 32 and 34, that has a side surface 82 that is normally maintained in light frictional engagement with the surface portion 45a of the spider element 45. Coil ring 81 is supported from the transmission housing 12 by means of a plurality of stud bolts 83 (only one shown). Bolts 83 have their threaded ends connected into the housing 12 so as to lock the bearing elements 13 in position in the housing 12. The head ends of the bolts 83 are provided with axially extending stud-like formations 85 that seat in bores 86 in the coil ring 81 so as to anchor the coil ring 81 against rotation. Stud portions 85 of bolts 83 mount compression springs 87 that normally urge the coil ring 81 into light frictional engagement with the surface portion 45a of the spider 45. Conductors 88 that connect the coil winding 89 of coil ring 81 to a suitable source of electrical energy may be housed within the housing sleeve 54 in the same manner as previously described with regard to the conductors 55 for the slip ring device 52, 53.

The control circuit for the several electromagnetically operated clutch and brake units associated with this transmission is schematically shown in Fig. 5. In this circuit diagram the battery or other source of electrical energy 92 is grounded at 93. Energy source 92 is connected to the energy supply terminal 94 through the series arranged ignition switch 95, fuse 96 and ammeter 97. Energy supply terminal 94 is connected by a branch circuit lead 91 to a rheostat device that includes pivotally mounted rheostat arm 98 that is adapted to swing across the resistance element 99 of the rheostat unit to vary the circuit resistance and thereby control the current flow to the conductor 100. The movement of the rheostat control arm 98 is controlled by the engine throttle control pedal or lever 101. Throttle control 101 is pivotally mounted at 102 and is fixedly connected by the link 103 to the rheostat arm 98. Link 103 also mounts the switch contact 104 on its lower end. The conductor 100, that is arranged to transmit current from the rheostat unit to the coil windings 39 and 51, is connected to a contact element 106 carried by the pivotally mounted transmission drive control lever 107. Lever 107 is an insulated element mounted to swing about the pivot point 108 so that it may assume the three positions R, N and F which indicate respectively the reverse, neutral and forward control positions of the transmission unit. Contact 106 is adapted to selectively engage the resistances 111 and 112 of a second rheostat device as the transmission control lever 107 is swung from the neutral position to the drive transmitting forward and reverse positions respectively. When lever 107 is in the neutral position the contact 106 is not engaged with either of the resistances 111 or 112 and the circuit through conductor 100 is broken. Resistances 111 and 112 are connected by the conductors 113 and 114 to the forward clutch coil winding 51 and the reverse brake coil winding 39 respectively. From Fig. 5 it is obvious that movement of the transmission control lever 107 from the neutral to either of the forward or reverse drive transmitting positions gradually reduces the resistance in the energy supply circuit to clutch and brake devices 32, 34. The clutch and brake coil windings 51 and 39 are grounded at 115 and 116 respectively.

The energy supply terminal 94 is also connected by the parallelly arranged branch circuit lead 109 to one of the pair of spaced contacts 117. The other of the contacts 117 is connected to a conductor 118. Conductor 118 is connected to a second contact 119 that is carried by the pivotally mounted, insulated, transmission control lever 107. Contact 119 is adapted to be selectively engaged with the contact bar elements 121 or 122 as lever 107 is swung between forward and reverse positions. As was the case with contact 106, the contact 119 does not engage a conductor element when the transmission control lever is in the neutral position and thus the circuit through the conductor 118 is always broken when the transmission control lever 107 is in the neutral position.

Energy supply terminal 94 is also connected by the parallelly arranged branch circuit conductor 110 to a conductor 125 that is adapted to directly transmit current from the supply source 92 to the neutral brake coil winding 89 whenever the control lever 107 is in the neutral position. Neutral brake coil winding 89 is grounded at 191. To prevent transmission of current to the neutral brake coil winding 89 at times when the lever 107 is in other than the neutral position, a separate pivotally mounted switch lever 127 is utilized. Lever 127 is pivotally mounted at 128 so as to swing in an arc similar to that of the transmission control lever 107. Lever 127 is connected to the lever 107 by the rigid link 129 such that levers 107 and 127 move in unison. Mounted on the lever 127 is a contact element 131 that is connected to the conductor 125. Contact 131 is arranged to engage the contact element 132 whenever transmission control lever 107 is in the neutral position. Contact 132 is connected to the neutral brake coil winding 89 by the conductor 133.

If the transmission control lever 107 is positioned in the neutral position as indicated in Fig. 5, it will be noted that the circuit from the battery 92 through the rheostat control arm 98, resistance 99 and conductor 100 is broken due to the fact that the contact 106, carried by the insulated lever 107, is out of contact with each of the resistances 111 and 112. Accordingly, whenever the transmission control lever 107 is in the neutral or no-drive position electrical energy cannot be supplied to either of the conductors 113 and 114 and thus neither the forward clutch 34 nor the reverse brake 32 is operative for the transmission of drive between the driving and driven shafts 10, 11. Furthermore, whenever the transmission control lever 107 is in the neutral position, the neutral brake coil winding 89 is energized due to the fact that the lever mounted contact 131 is engaged with the contact 132 and thus electrical energy is supplied through conductor 125 to the neutral brake coil winding 89. Energization of the neutral brake 80 will anchor the driven shaft 11 against rotation. With the control system herein disclosed it is thought to be obvious that racing the engine during warm up periods by full depression of the throttle control pedal 101 will never cause the transmission of drive through the gear box even though the accelerator pedal 101 might be depressed to such a degree that the contact 104 is engaged with the contacts 117. If contacts 104 and 117 are engaged by the depression of accelerator pedal 101, while drive control lever 107 is in the neutral position, then the conductor 118 transmits current to the contact 119 but contact 119 will not be engaged with either of the conductor contacts 121 or 122 when transmission control lever 107 is in the neutral position. Thus there is no means for energizing the brake or clutch 32, 34 and thus no means for transmitting a drive through the gear box when the lever 107 is in the neutral position regardless of the condition of the throttle control 101.

At closed throttle it will be noted that energy is delivered to the conductor 100 through the resistance 99. On initial movement of the transmission drive control lever 107 into either a forward or reverse control position, the contact 106 carried by the drive control lever 107 is moved along one of the resistances 111 or 112 and the amount of resistance in the circuit is gradually diminished such that the current supplied to the coil windings 51 and 89 is gradually increased to thereby gradually energize the coil windings 39 or 51. This gradual energization of the coil windings 39 or 51 causes a feathered or modulated engagement of the associated armature elements 30a, 30b with the coil elements 34, 32 in the manner previously described. Thus it will be seen that the mere movement of the transmission drive control lever 107 from its neutral position to either its forward or reverse position produces a modulated engagement of the associated clutch or brake device 34, 32.

After the transmission control lever 107 has been moved into its selected forward or reverse position, subsequent depression of the throttle control lever 101 will further modulate or feather the action of the associated clutch or brake elements 34, 32 respectively, due to the fact that the throttle control lever 101 is directly connected to the rheostat control arm 98. Depression of throttle control lever 101 swings the rheostat control lever 98 across the resistance element 99 and gradually cuts out the resistance 99 in the circuit to the conductor 100. The electromagnetic forces urging the armature units 30a, 30b into engagement with the associated devices 34 or 32 are thus gradually increased in intensity as the throttle is depressed and thus the torque transmitting capacity of the clutch 34 and the holding capacity of the brake 32 are proportional to the load applied thereto. When the throttle lever 101 has been depressed to about one-quarter (¼) or one third (⅓) of its throttle opening movement the contact 104, carried by the throttle control lever 101, will be engaged with the contacts 117 and at this time the circuit through conduit 100 is short circuited and electrical energy is now applied from the terminal 94 to the conductor 118. If the drive control lever 107 is in a drive transmitting position when conductor 118 becomes active for the transmission of electrical energy, then the contact 119 attached to conductor 118 is in engagement with one or the other of the contact bars 121, 122 and the full force of the energy in the circuit is directly transmitted to the clutch or brake 34 or 32 respectively. From the above it is thought to be clear that at all times when the transmission drive control lever 107 is set for either forward or reverse drive and the throttle control lever is opened more than a predetermined amount, such as, one quarter (¼) or one third (⅓) of throttle opening movement, then the electromagnetic circuits for the clutch and brake 32, 34 may be selectively energized and a substantially positive drive can be transmitted between the driving and driven shafts 10, 11.

The control circuit shown in Fig. 5 is particularly advantageous for trolling operations and the like due to the fact that the transmission control lever 107 can be moved into its forward drive position and at this time the clutch will be engaged and held by an electromagnetic force that is sufficient to transmit the very low speed drive required for trolling operations. During trolling the throttle control lever 101 is merely depressed the required amount to establish the necessary trolling speed and thereafter further operation of the throttle control 101 is unnecessary.

Whenever it is desired to shift from forward to reverse during maneuvering, the normal operation of releasing the throttle control 101 cuts out the circuit through the conductor 118 and thereafter the effective control circuit is through the series arranged resistances 99 and 111 or 112. Movement of the drive control lever 107 then gradually increases the resistance in the circuit being deenergized and thereafter gradually reduces the resistance in the circuit being energized. This resistance control of the electromagnetic circuits insures smooth fast changes in drive transmission. Furthermore, at the time that the drive control lever 107 moves into its centrally located neutral position between the forward and reverse positions, the neutral brake 80 is applied and this anchors the driven shaft 11 so that the subsequent engagement of the clutch or brake 34, 32 will be very smooth due to the fact that the driven shaft has been braked between the time that it is reversed in direction. It is thought that the above description of the operation of this transmission points out the several advantages of this novel transmission control system.

The power transmission unit hereinabove described is arranged to be controlled by electrically operated means that require a continuous source of electrical energy. To prevent the power transmission unit from being inoperative when there might be a failure in the power supply source, this transmission also includes means whereby an auxiliary, mechanical, positive clutch device 140 may be manually operated to drivingly connect the driving and driven shafts 10, 11 irrespective of the condition of the electrical controls for the power transmission unit. The manually operable mechanical clutch 140 comprises a toothed sleeve 141 splined to the driving shaft 10 at 142 and shiftable axially along the driving shaft 10. The teeth 143 of sleeve 141 are adapted to be moved into and out of engagement with teeth 144 formed around the periphery of an opening in the side wall of the carrier case 21.

When the teeth 143 of sleeve 141 are engaged with the teeth 144 of carrier case 21 then driving shaft 10 and carrier case 21 are locked together in such a manner that the differential gearing 16, 26, 17, becomes a unitary structure and transmits direct drive from the drive shaft 10 to the driven shaft 11. The clutch device 140 is the mechanical equivalent of the electromagnetically operated clutch 34 and thus this transmission includes two means whereby direct drive may be transmitted between the shafts 10, 11, one means being the mechanical clutch 140 and the other means the electromagnetically controlled clutch 34.

Actuation of the toothed clutch sleeve 141 is controlled by the movement of the clutch operating lever 146. Lever 146 is pivoted at 147 to an ear 148 carried by the transmission housing 12. The free end 149 of lever 146 is positioned in a groove 150 formed in the sleeve 141 such that sleeve 141 may rotate relative to the lever end 149. The pivoted end of lever 146 has a portion 151 arranged to be engaged by the threaded end of a set screw 152 which screw is threadably mounted in the transmission housing 12. Normally the set screw 152 is threaded into the housing to such a degree that the pivoted lever 146 is held in the position shown in Fig. 1. Set screw 152 is maintained in this position by means of the anchor wire 153 that is connected between an anchor device 154 and the head of the set screw 152. Resilient means such as the spring 155 is compressed between the housing wall 148 and the clutch operating lever 146 such that on release of the set screw 152 the spring 155 will swing the operating lever 146 counterclockwise about its pivot point 147 and thereby move the toothed sleeve 141 into engagement with the teeth 144 of the carrier case 21. Due to the availability of the positive clutch mechanism 140, it always is possible to transmit drive between the shafts 10 and 12 even though the electrical system for controlling the several electromagnetic clutches and brakes 32, 34, 80 might be inoperative. Futhermore, as the clutch device 140 can be utilized to positively connect the driving and driven shafts 10, 11 it is possible to start the engine unit associated with this power transmission device by means of pulling the vessel through the water and causing the propeller to drive the engine and to thus cause firing of the engine even though the electrical system might be dead. The incorporation of a positive safety clutch such as a clutch 140 in an electrically operated power transmission unit of the type herein described is considered to be a very definite improvement in mechanisms of the type herein described. It will be noted that the positive clutch device 100 may be simultaneously engaged during engagement of the electromagnetically operated clutch 34 to prevent slip of the clutch 34, or it may be separately operated when the clutch 34 is inoperative.

I claim:

1. In a transmission comprising a housing journalling a pair of axially aligned driving and driven shafts, a differential gear set connected between said shafts comprising a carrier case containing said gear set extending between and mounted for rotation relative to said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a first pair of armatures arranged concentrically about the central portion of said carrier case in substantially face-to-face relationship, said first pair of armatures each being drivingly connected to and mounted on said carrier case for movement axially thereof, a second pair of armatures arranged concentrically about said carrier case and drivingly connected thereto, said second pair of armatures being arranged on opposite sides of said first pair of armatures, an electromagnetic brake element fixed to said housing having portions arranged between a pair of said first and second armatures, energization of said brake element being effective to engage said brake portions and a pair of said first and second armatures to anchor said carrier case to said housing to provide means for the drive of said driven shaft in a direction opposite to that of said driving shaft, and an electromagnetic clutch element carried by said driven shaft having portions arranged between the other pair of first and second armatures, energization of said clutch element being effective to engage said clutch portions and said other pair of armatures to drivingly connect said carrier case and said driven shaft to provide means for the drive of said driven shaft in the same direction as said driving shaft.

2. In a transmission comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a pair of armatures arranged concentrically about said carrier case in face-to-face relationship, said armatures each being drivingly connected to and shiftably mounted on said carrier case, an electromagnetic brake element fixed to said housing having portions arranged adjacent an outer surface of one of said armatures, energization of said brake element being effective to engage said brake portions and said one armature to anchor said carrier case to said housing to provide means for the drive of said driven shaft in a direction opposite to that of said driving shaft, and an electromagnetic clutch element carried by said driven shaft having portions arranged adjacent an outer surface of the other armature, energization of said clutch element being effective to engage said clutch portions and said other armature to drivingly connect said carrier case and said driven shaft to provide means for the drive of said driven shaft in the same direction as said driving shaft, and resilient means normally urging said armatures apart to cause contact between the said brake and clutch portions and the adjacently positioned armature elements.

3. In a transmission comprising driving and driven shafts, differential gearing mounted on and connectible between said shafts to provide for the drive of said driven shaft in opposite directions, said gearing including a gearing carrier case rotatably mounted on said shafts adapted to be selectively connected to said driven shaft and anchored against rotation to effect drive of the driven shaft in said opposite directions, a pair of annular armature plates encircling said carrier case and drivingly connected thereto, said armature plates being relatively movable in an axial direction and arranged in face-to-face relationship with resilient means normally urging the plates apart, an electromagnetic clutch element drivingly mounted on one of said shafts having portions arranged adjacent one of said armature plates and engageable therewith, an electromagnetic brake element fixedly supported relative to said carrier case having portions arranged adjacent the other of said armature plates and engageable therewith, and an electrical control circuit for said clutch and brake elements adapted to provide for selective energization thereof to effect drive of the driven shaft in opposite directions.

4. In a transmission as set forth in claim 3 wherein the inwardly disposed, opposed faces of the armature plates include surface grooving.

5. In a transmission as set forth in claim 3 wherein the outwardly disposed faces of the armature plates are formed with minute depressions.

6. In a transmission as set forth in claim 3 wherein a manually operated, positive, mechanical clutch device is provided between one of said shafts and said carrier case.

7. In a transmission comprising driving and driven shafts, differential gearing mounted on and connectible between said shafts to provide for the drive of said driven shaft in opposite directions, said gearing including a gearing carrier case rotatably mounted on said shafts adapted to be selectively connected to said driven shaft and anchored against rotation to effect drive of the driven shaft in said opposite directions, a pair of annular armature plates encircling said carrier case and drivingly connected thereto, said armature plates being relatively movable in an axial direction and arranged in face-to-face relationship with resilient means normally urging the plates apart, an electromagnetic clutch element drivingly mounted on one of said shafts having portions arranged adjacent one of said armature plates and engageable therewith, a first electromagnetic brake element fixedly supported relative to the carrier case having portions arranged adjacent the other of said armature plates and engageable therewith, a second electromagnetic brake element fixedly supported relative to said carrier case having portions arranged adjacent to and engageable with said carrier case, and an electrical control circuit for said electromagnetic clutch and brake elements including a transmission control lever operated switch arranged to selectively effect energization and deenergization of said clutch element and said first brake element, movement of said control lever to a position to deenergize either said clutch element or said first brake element automatically effecting energization of said second brake element.

8. In a transmission comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a pair of armatures concentrically mounted about said carrier case having inner surfaces in face-to-face relationship, resilient means normally urging said inner armature faces apart, each of said armatures being drivingly connected to and axially shiftable on said carrier case, a first electromagnetic brake element fixed to said housing having portions arranged adjacent a side surface of one of said armatures, energization of said brake element being effective to engage the said brake portions and said one armature to anchor said carrier case to said housing and provide means for the drive of said driven shaft in one direction, an electromagnetic clutch element carried by said driven shaft having portions arranged adjacent a side surface of the other of said armatures, energization of said clutch element being effective to engage said clutch portions and said other armature to drivingly connect said carrier case and said driven shaft and provide means for the drive of said driven shaft in the opposite direction, and a second electromagnetic brake element fixed to said housing having portions arranged adjacent to and adapted to be engaged with portions of said driven shaft on energization of said second brake element to anchor said driven shaft against rotation in either direction.

9. In a transmission comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a pair of armatures concentrically mounted about said carrier case having inner surfaces in face-to-face relationship, resilient means normally urging said inner armature faces apart, each of said armatures being drivingly connected to and axially shiftable on said carrier case, a first electromagnetic brake element fixed to said housing having portions arranged adjacent a side surface of one of said armatures, energization of said brake element being effective to engage the said brake portions and said one armature to anchor said carrier case to said housing and provide means for the drive of said driven shaft in one direction, an electromagnetic clutch element carried by said driven shaft having portions arranged adjacent a side surface of the other of said armatures, energization of said clutch element being effective to engage said clutch portions and said other armature to drivingly connect said carrier case and said driven shaft and provide means for the drive of said driven shaft in the opposite direction, a second electromagnetic brake element fixed to said housing having portions arranged adjacent to and adapted to be engaged with portions of said driven shaft on energization of said second brake element to anchor said driven shaft against rotation in either direction, and an electrical control circuit for said electromagnetic clutch and brake elements comprising a transmission control lever operated switch to provide for the selective energization of said clutch element and said first brake element, said transmission control lever operated switch being arranged to automatically energize said second brake element when either of said clutch or first brake element is deenergized.

10. In combination, an engine driven power transmission unit including a drive shaft, a throttle control for the engine, a driven shaft, gearing selectively connectible between said shafts to provide for drive of the driven shaft in opposite directions, an electromagnetically operated clutch associated with said gearing and adapted to be energized to provide for the drive of said driven shaft in one direction, an electromagnetically operated brake associated with said gearing and adapted to be energized to provide for drive of said driven shaft in the opposite direction, a drive control element to provide for selective energization of the clutch and brake, and an electrical control circuit for said electromagnetically operated clutch and brake comprising a source of electrical energy selectively connectible by said drive control element to either said clutch or said brake through a pair of parallelly arranged branch circuits, one of said branch circuits including a first rheostat device operatively connected to said throttle control such that opening the throttle reduces the resistance of the first rheostat device and a transmission drive control element operated second rheostat device in series with said first rheostat device and arranged such that movement of the drive control elever from a no-drive position to a drive transmitting position reduces the resistance of the second rheostat device, the other of said parallelly arranged branch circuits including a switch operatively connected to said throttle control and arranged such that it is open at closed throttle and closed after a predetermined opening of the throttle, closing of said switch short circuiting said one branch circuit and directly connecting the power supply with the clutch or the brake depending on the drive transmitting position of said drive control element.

11. In combination, an engine driven power transmission unit including a drive shaft, a throttle control for the engine, a driven shaft, gearing selectively connectible between said shafts to provide for drive of the driven shaft in opposite directions, an electromagnetically operated clutch connected to said gearing and adapted to be energized to provide for the drive of said driven shaft in one direction, a first electromagnetically operated brake connected to said gearing, and adapted to be energized to provide for drive of said driven shaft in the opposite direction, a second electromagnetically operated brake connected to said gearing and adapted to be energized to anchor said driven shaft against rotation, a transmission drive control lever to provide for selective energization of the clutch and the brakes, and an electrical control circuit for said electromagnetically operated clutch and brakes comprising a source of electrical energy selectively connectible by said transmission drive control lever to either said clutch or said first brake through a pair of parallelly arranged branch circuits, one of said branch circuits including a first rheostat device operatively connected to said throttle control such that opening the throttle reduces the resistance of the first rheostat device and a transmission drive control lever operated second rheostat device in series with said first rheostat device and arranged such that movement of the transmission drive control lever from a neutral position to a drive transmitting position reduces the resistance of the second rheostat device, the other of said parallelly arranged branch circuits including a switch operatively connected to said throttle control and arranged such that it is open at closed throttle and closed after a predetermined opening of the throttle, closing of said switch short circuiting said one branch circuit and directly connecting the power supply with the preselected clutch or brake depending on the preselected drive transmitting position of said transmission drive control lever, and a third branch circuit connected in parallel with said pair of branch circuits connecting said source of electrical energy to said second brake, said third branch circuit including a switch operatively connected to said transmission drive control lever such that said switch is closed only when said transmission drive control lever is in neutral position.

12. In combination, an engine driven power transmission unit including a drive shaft, a throttle control for the engine, a driven shaft, gearing selectively connectible between said shafts to provide for drive of the driven shaft in opposite directions, a first electrically operated drive control unit associated with said gearing and adapted to be energized to provide for the drive of said driven shaft in one direction, a second electrically operated drive control unit associated with said gearing and adapted to be energized to provide for drive of said driven shaft in the opposite direction, a transmission drive control element to provide for selective energization of the first and second drive control units, and an electrical control circuit for said drive control units comprising a source of electrical energy selectively connectible by said transmission drive control element to said drive control units through a pair of parallelly arranged branch circuits, one of said branch circuits including a first variable resistance operatively connected to said throttle control such that opening the throttle reduces the effective resistance of the first variable resistance and a drive control element operated second variable resistance in series with said first variable resistance and arranged such that movement of the transmission drive control element from a no-drive position to a drive transmitting position reduces the resistance of the second variable resistance, the other of said parallelly arranged branch circuits including a switch operatively connected to said throttle control and arranged such that it is open at closed throttle and closed after a predetermined opening of the throttle, closing of said switch short circuiting said one branch circuit and directly connecting the power supply with one of the drive control units.

13. In combination, an engine driven power transmission unit including a drive shaft, a throttle control for the engine, a driven shaft, gearing selectively connectible between said shafts to provide for drive of the driven shaft in opposite directions, a first electrically operated drive control unit connected with said gearing and adapted to be energized to provide for the drive of said driven shaft in one direction, a second electrically operated drive control unit connected with said gearing and adapted to be energized to provide for drive of said driven shaft in the opposite direction, a third electrically operated drive control unit adapted to be energized to anchor said driven shaft against rotation, a transmission drive control element to provide for selective energization of the drive control units, and an electrical control circuit for said electrically operated drive control units comprising a source of electrical energy selectively connectible by said transmission drive control elements to said first and second drive control units through a pair of parallelly arranged branch circuits, one of said branch circuits including a first variable resistance operatively connected to said throttle control such that opening the throttle reduces the resistance of the first variable resistance and a transmission drive control element operated second variable resistance in series with said first variable resistance and arranged such that movement of the transmission drive control element from a no-drive position to a drive transmitting position reduces the resistance of the second variable resistance, the other of said parallelly arranged branch circuits including a switch operatively connected to said throttle control and arranged such that it is open at closed throttle and closed after a predetermined opening of the throttle, closing of said switch short circuiting said one branch circuit and directly connecting the power supply with one of said first or second drive control units, and a third branch circuit arranged in parallel with the aforementioned pair of branch circuits and connected to said third drive control unit, said third branch circuit including a switch operatively connected to said transmission drive control element and arranged such that said switch is closed only when said drive control element is in a no-drive position.

14. In combination, an engine driven drive shaft, an engine throttle control, a driven shaft, gearing selectively connectible between said shafts to provide for rotation of the driven shaft in opposite directions, an electrically operated clutch connected to said gearing adapted to be energized to provide for rotation of the driven shaft in one direction, an electrically operated brake connected to said gearing adapted to be energized to provide for rotation of the driven shaft in the opposite direction, a drive control lever to provide for selective energization of the clutch and brake, and an electrical control system for the clutch and brake comprising a source of electrical energy connected by circuit means to said clutch and brake, said circuit means including a pair of parallelly arranged branch circuits connected to both said clutch and said brake, one branch circuit including a pair of variable resistances arranged in series having one of said resistances controlled by movement of the throttle control and the other of said resistances controlled by movement of said drive control lever, the other of said branch circuits including a normally open throttle control operated switch adapted to be closed after a predetermined throttle opening.

15. In combination, an engine driven drive shaft, an engine throttle control, a driven shaft, gearing selectively connectible between said shafts to provide for rotation of the driven shaft in opposite directions, an electrically operated clutch unit connected to said gearing and adapted to be energized to provide for rotation of the driven shaft in one direction, a first electrically operated brake connected to said gearing adapted to be energized to provide for rotation of the driven shaft in the opposite direction, a second electrically operated brake adapted to be energized to engage and anchor said driven shaft against rotation, a drive control element for the gearing selectively positionable in forward drive, reverse drive and no-drive positions to respectively effect energization of the clutch and first and second brakes, and an electrical control circuit for the clutch and brakes comprising a source of electrical energy conductor means to connect said source to said clutch and brakes including a pair of parallelly arranged branch circuits, each of which is arranged to be connected to both said clutch and said first brake, one of said pair of branch circuits including a pair of variable resistances arranged in series with one of said resistances controlled by the opening and closing movement of the throttle control and the other of said resistances controlled by the movement of the drive control element between no-drive and drive transmitting positions, the other of said pair of branch circuits including a throttle control operated, normally open, switch that is closed after a predetermined throttle opening to provide a means for short circuiting said one branch circuit, and a third branch circuit arranged in parallel with said aforementioned pair of branch circuits and adapted to connect said electrical source to said second brake, said third branch circuit including a switch operatively connected to said drive control element and arranged to be closed only when said drive control element is in the no-drive position.

16. In combination, an engine driven power transmission unit including a drive shaft, a throttle control for the engine, a driven shaft, gearing selectively connectible between said shafts to provide for drive of the driven shaft in opposite directions including a pair of armatures drivingly connected to said gearing and arranged to be selectively and cooperatively shifted between drive and no-drive transmitting positions by electrically operated means, an electromagnetically operated clutch connected to said gearing and adapted to be energized to establish engagement with one of said armatures to provide for the drive of said driven shaft in one direction, a first electromagnetically operated brake connected to said gearing and adapted to be energized to establish engagement with the other of said armatures to provide for drive of said driven shaft in the opposite direction, a second electromagnetically operated brake connected to said gearing and adapted to be energized to establish a no-drive condition that anchors said driven shaft against rotation, a transmission drive control lever to provide for selective energization of the clutch and the brakes, and an electrical control circuit for said electromagnetically operated clutch and brakes comprising a source of electrical energy selectively connectible by said transmission drive control lever to either said clutch or said first brake through a pair of parallelly arranged branch circuits, one of said branch circuits including a first variable resistance unit operatively connected to said throttle control such that opening the throttle reduces the resistance of the first resistance unit and a transmission drive control lever operated second variable resistance unit in series with said first variable resistance unit and arranged such that movement of the transmission drive control lever from a no-drive position to a drive transmitting position reduces the resistance of the second resistance unit, the other of said parallelly arranged branch circuits including a first switch operatively connected to said throttle control and arranged such that it is open at closed throttle and closed after a predetermined opening of the throttle, closing of said first switch being effective to short circuit said one branch circuit and directly connecting the power supply with the preselected clutch or first brake depending on the preselected drive transmitting position of said transmission drive control lever, and a third branch circuit connected in parallel with said pair of branch circuits connecting said source of electrical energy to said second brake, said third branch circuit including a second switch operatively connected to said transmission drive control lever such that said second switch is closed only when said transmission drive control lever is in the no-drive position.

17. An engine driven transmission adapted to transmit drive in opposite directions and to be conditioned for no-drive comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a pair of armatures arranged concentrically about said carrier case in face-to-face relationship, said armatures each being drivingly connected to and shiftably mounted on said carrier case for axial movement, an electromagnetic brake element fixed to said housing having portions arranged adjacent an outer surface of one of said armatures, energization of said brake element being effective to engage said brake portions and said one armature to anchor said carrier case to said housing to provide means for the drive of said driven shaft in a direction opposite to that of said driving shaft, and an electromagnetic clutch element carried by said driven shaft having portions arranged adjacent an outer surface of the other armature, energization of said clutch element being effective to engage said clutch portions and said other armature to drivingly connect said carrier case and said driven shaft to provide means for the drive of said driven shaft in the same direction as said driving shaft, resilient means normally urging said armatures apart to cause light contact between the said brake and clutch portions and the adjacently positioned armature elements, an engine throttle control, a transmission drive control element, and an electrical control circuit for said clutch and brake elements comprising a source of electrical energy selectively connectible by said transmission drive control element to either said clutch or said brake element through a pair of parallelly arranged branch circuits, one of said branch circuits including a first variable resistance device operatively connected to said throttle control such that opening the throttle reduces the resistance of the first resistance device and a transmission drive control element operated second variable resistance device in series with said first resistance device and arranged such that movement of the transmission drive control element from the no-drive position to a drive transmitting position reduces the resistance of the second resistance device, the other of said parallelly arranged branch circuits including a switch operatively connected to said throttle control and arranged such that it is open at closed throttle and closed after a predetermined opening of the throttle, closing of said switch short circuiting said one branch circuit and directly connecting the power supply with one of the aforesaid clutch or the brake elements depending on the drive transmitting position of said transmission drive control element.

18. An engine driven transmission adapted to transmit drive in either of two opposite directions and to be conditioned for no-drive comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a pair of armatures concentrically mounted about said carrier case having inner surfaces in face-to-face relationship, resilient means normally urging said inner armature faces apart, each of said armatures being drivingly connected to and axially shiftable on said carrier case, a first electromagnetic brake element fixed to said housing having portions arranged adjacent a side surface of and normally engaged with one of said armatures, energization of said brake element being effective to drivingly engage the said brake portions and said one armature to anchor said carrier case to said housing and provide means for the drive of said driven shaft in one direction, an electromagnetic clutch element carried by said driven shaft having portions arranged adjacent to and normally engaged with a side surface of the other of said armatures, energization of said clutch element being effective to drivingly engage said clutch portions and said other armature to drivingly connect said carrier case and said driven shaft and provide means for the drive of said driven shaft in the opposite direction, a second electromagnetic brake element fixed to said housing having portions arranged adjacent to and adapted to be engaged with portions of said driven shaft on energization of said second brake element to anchor said driven shaft against rotation in either direction and establish the no-drive condition, a transmission drive control element to selectively control energization of said clutch and brake elements, an engine throttle control, and an electrical control circuit for said electromagnetically operated clutch and brake elements comprising a source of electrical energy selectively connectible by said transmission drive control element to either said clutch or said first brake element through a pair of parallelly arranged branch circuits, one of said branch circuits including a first variable resistance device operatively connected to said throttle control such that opening the throttle reduces the resistance of the first resistance device and a transmission drive control element operated second variable resistance device in series with said first resistance device and arranged such that movement of the transmission drive control element from a no-drive position to a drive transmitting position reduces the resistance of the second resistance device, the other of said parallelly arranged branch circuits including a first switch operatively connected to said throttle control and arranged such that it is open at closed throttle and closed after a predetermined opening of the throttle, closing of said first switch short being effective to circuit said one branch circuit and directly connecting the power supply with the preselected clutch or brake element depending on the preselected drive transmitting position of said transmission drive control element, and a third branch circuit connected in parallel with said pair of branch circuits and arranged to connect said source of electrical energy to said second brake element, said third branch circuit including a second switch operatively connected to said transmission drive control element such that said second switch is closed only when said transmission drive control element is in the no-drive position.

19. In a forward and reverse drive gear mechanism, a support, a driving shaft and a driven shaft journaled in said support, differential gearing connected between said shafts comprising a gear carrier case encircling adjacent portions of said shafts and rotatably mounted relative thereto, a first pair of ring-like armatures encircling said carrier case and drivingly connected thereto so as to provide for movement of said first pair of armatures axially of the carrier case, a second pair of ring-like armatures encircling said carrier case and drivingly connected thereto, said second pair of armatures being arranged axially of said carrier case so as to be positioned on opposite sides of said first pair of armatures, a first electromagnetic coil unit mounted on said support having portions thereof encircling said carrier case and positioned between one pair of said first and second armatures, a second electromagnetic coil unit mounted on one of said shafts having portions thereof encircling said carrier case and positioned between the other pair of said first and second armatures, and electrically operated control means to selectively activate the several coil units.

20. In a forward and reverse drive gear mechanism, a support, a driving shaft and a driven shaft journaled in said support, differential gearing connected between said shafts comprising a gear carrier case encircling adjacent portions of said shafts and rotatably mounted relative thereto, a first pair of ring-like armatures encircling said carrier case and drivingly connected thereto so as to provide for movement of said first pair of armatures axially of the carrier case, a second pair of ring-like armatures encircling said carrier case and drivingly connected thereto, said second pair of armatures being arranged axially of said carrier case so as to be positioned on opposite sides of said first pair of armatures, a first electromagnetic coil unit mounted on said support having portions thereof encircling said carrier case and positioned between one pair of said first and second armatures, a second electromagnetic coil unit mounted on one of said shafts having portions thereof encircling said carrier case and positioned between the other pair of said first and second armatures, a third electromagnetic coil unit mounted on said support having portions thereof engageable with armature portions carried by one of said shafts, and electrically operated control means to selectively activate the several coil units.

HENRY W. GILFILLAN.

REFERENCES CITED

The following references are of record in the file of this patent:

UNITED STATES PATENTS

| Number | Name | Date |
|---|---|---|
| 1,136,279 | Severy | Apr. 20, 1915 |
| 1,476,458 | Murray | Dec. 4, 1923 |
| 1,609,782 | Small et al. | Dec. 7, 1926 |
| 1,721,592 | Gattrell | July 23, 1929 |
| 1,800,946 | Mantha | Apr. 14, 1931 |
| 2,009,191 | Buckles | July 23, 1935 |
| 2,104,658 | Langdon | Jan. 4, 1938 |
| 2,176,897 | Fodor | Oct. 24, 1939 |
| 2,238,574 | Thomas et al. | Apr. 15, 1941 |
| 2,296,520 | Griswold | Sept. 22, 1942 |
| 2,309,051 | Dodge | Jan. 19, 1943 |
| 2,321,098 | Morse | June 8, 1943 |
| 2,420,856 | Brill et al. | May 20, 1947 |
| 2,422,596 | Stevens | June 17, 1947 |
| 2,547,038 | Parrish | Apr. 3, 1951 |